United States Patent Office 3,408,361
Patented Oct. 29, 1968

3,408,361
METHODS FOR PRODUCING IMIDAZOLINES
AND DERIVATIVES THEREOF
Hans S. Mannheimer, 23 Haines Cove Drive,
Toms River, N.J. 08753
No Drawing. Continuation-in-part of application Ser. No. 544,373, Apr. 22, 1966. This application Apr. 5, 1967, Ser. No. 628,519
20 Claims. (Cl. 260—309.6)

ABSTRACT OF THE DISCLOSURE

Methods for producing high imidazoline-content reaction mass of reduced diamide-content by continuously maintaining at least about 1.08 moles of diamine reactant ($NH_2C_2H_4NHR_1$) per mole of monocarboxylic acid (RCOOH) orginally in the mass during entire period of reaction accompanied by formation water of reaction removing a distillate comprising said water and some diamine, said about 1.08 mols of diamine calculated on the basis that none of the unremoved diamine has been reacted. Said reaction mass is a useful product of commerce and also may be reacted in aqueous media to produce 20–50% solutions of the amphoteric derivatives thereof by following the methods of the patents hereinafter indentified. Said reaction masses as well as the water soluble derivatives thereof are products of commerce and are useful in emulsions, cosmetics, detergents, etc., especially when combined with other components.

Cross-reference to related application

The present application is a continuation-in-part of U.S. patent application Ser. No. 544,373 filed Apr. 22, 1966, now abandoned.

Background of the invention

This invention relates to methods for producing high imidazoline-content reaction masses of reduced diamide-content. In one of its more specific aspects the invention is directed to novel methods for achieving that result in the production of imidazolines of the following generic Formula I, when a fatty acid (RCOOH) or an equivalent thereof, such as its anhydride, is reacted with a diamine ($NH_2C_2H_4NHR_1$):

(I)

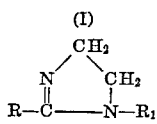

wherein R is hydrocarbon of at least 5 carbon atoms and preferably of 5–25 carbon atoms; R is preferably aliphatic, cycloaliphatic, aliphatic-aromatic or the hydrocarbon radical of a resinic acid. When aliphatic, it is straight or branched chain preferably alkyl or alkylene (containing one or more olefinic linkages), when aliphatic-aromatic, the aliphatic group is alkyl or alkylene and is of at least 6 carbon atoms and the aromatic group is preferably mononuclear and when the hydrocarbon radical of a resinic acid it contains a number of fused rings; $R_1$ is alkyl or 2–4 carbon atoms or alkylol of 2–4 carbon atoms.

Prior to this invention, I subjected a batch mix consisting of one mole of one of said diamines and one mole of one or a combination of two or more of said fatty acids to heat to elevate the temperature thereof in a reaction vessel having a reflux condenser coupled therewith. The temperature was increased progressively while maintaining the mass under reduced pressure conditions and continuously removing therefrom through said condenser, distillate, consisting of water of reaction and some diamine, until at least 1.75 and generally until about 1.75–about 2 moles of water of reaction were removed therefrom, thereby to provide a reaction mass consisting essentially of imidazoline measuring at least about 75% by weight thereof, a small proportion of unwanted diamide derivative of the fatty acid measuring about 6–10% by weight of said mass, with or without substantial proportion of monoamide derivative of the fatty acid.

Said reaction masses are water-dispersible, but are water-insoluble. Also prior to the present invention, I reacted the resultant reaction masses with an appropriate agent in an aqueous medium thereby to produce water-soluble derivatives of said imidazolines and monoamides, which derivatives were dissolved in the aqueous medium in which the reaction occurred. Said derivatives of said imidazolines and monoamides were present in said solutions in concentrations of about 20–50%, depending upon the amount of water used, and remained in solution even when said solutions were maintained at 40° F. for an unlimited time. The diamide component therein, however, precipitated or grained out therefrom when said solutions were maintained at room temperature, 70° F., for an extended period. When said solutions were maintained at 40° F., precipitation or graining out was much faster and generally started within 1–7 days, depending upon the fatty acid employed, and continued for days thereafter. Some of the agents which may be used for the aforesaid purpose are quaternizing agents, such as hydrochloric acid, benzyl chloride, diethyl sulfate, etc. to produce water-soluble quaternary derivatives of said imidazolines and monoamide. Some other agents which may be used are those described in my U.S. Patents 2,258,378; 2,773,068 and 3,231,581 for producing derivatives of the imidazolines and monoamide which are water-soluble amphoterics which are dissolved in an aqueous medium. These patents also disclose methods for producing the imidazolines and certain water-soluble amphoteric derivatives thereof dissolved in an aqueous medium, and also disclose fatty acid reactants, all of which may be used in the practice of the present invention.

Said reaction masses as well as the water-soluble derivatives thereof are products of commerce and are useful in emulsions, cosmetics, detergents, etc., especially when combined with other components. In order to illustrate and point up the significance of the present invention, I shall hereinafter show the effect of the presence of said diamides in a class of aqueous solutions produced by reacting the reaction masses with agents to produce the water-soluble amphoteric derivatives of the imidazoline components thereof. Using the method described in 2,528,378 or 2,773,068, there is provided an aqueous solution, whose major organic component is a mono or dicarboxylate derivative of the imidazoline and whose organic content measures about 20–50% by weight thereof. Said solutions of said 20–50% concentration represent "finished" products of commerce which were often combined with other components to provide a variety of different compositions used for different purposes, and especially in the field of cosmetics, by the ultimate consumers. Said aqueous solutions of said masses were crystal-clear and free of graining or precipitate when first produced, due to the diamides being soluble or so dispersible therein at that stage that they could not be seen by the naked eye. However, after storage precipitate appeared within about 1–21 days thereafter depending upon the storage conditions and especially the storage temperature. The precipitates were the diamide derivatives of the original fatty acid and diamine reaction. When said solutions were maintained at temperatures materially below 70° F., as for example 40° F., precipitation gradually occurred initially and continued in the form of crystalline particles with gradual growth of crystal clusters which became voluminous and measure up to about 6% of the organic matter therein. The presence of said graining or said precipitates endowed said otherwise clear solutions with an obviously undesirable and obnoxious characteristic. Consequently, for high quality "finished" products, the crystal-clear solutions were processed to remove at least a sufficient proportion thereof that no precipitation will occur therein during storage for 3 months at 40° F. It was found that said solutions even when at 40° F. would tolerate smaller amounts of said diamide, with the amounts being different depending upon the fatty acid employed. This processing was very expensive, cumbersome and time consuming and required a minimum procedure whereby the "finished" product be stored for not less than 7 days at a temperature no greater than 40° F. after which it was filtered, while being maintained at such low temperature, by at least one pass through the densest asbestos filter pad commercially available. A further requirement was a pump which would not cause crushing of the diamide crystals in the medium pumped thereby, otherwise they would be so modified that they would pass through the filter and later agglomerate or in some other manner precipitate out. Consequently, high production gear pumps could not be used. It was found that such long storage or ageing times and low temperatures were necessary for good results. Higher temperatures and/or shorter times in storage resulted in the production of products which appeared clear immediately after filtration, but diamide precipitated out after some ageing, less than 21 days thereafter at 40° F. and therefore did not meet the requirements of high quality products desired. Another problem which was present was that said "finished" products were normally viscous when initially produced and then when the temperatures thereof were lowered to a value of 40° F., their viscosities increased tremendously thereby making the filtration step a very difficult task. This difficulty was further increased because the filter pads tended to clog or fill up very quickly, and consequently, frequent changes of filter pads were demanded which was costly both in labor and filter pads and also in loss of material, other than diamide, absorbed by the removed pads.

I also found that using the same apparatus as before described, even when a batch consisting of one mole of fatty acid and 1.06 moles of diamine (thereby providing a 6% molar excess of diamine) was heated to increasing temperatures while being maintained under decreasing pressure conditions and continuously removing therefrom through the condenser distillate containing diamine and water of reaction until at least 1.75 moles of said water were removed, that the organic components in the resulting mass consisted essentially of a compound of said generic Formula I, and the monoamide derivative of the fatty acid. The resulting mass also contained an amount of the undesired diamide derivative of the fatty acid measuring more than 6% by weight of the mass, and also contained unreacted diamine measuring about 3% by weight thereof.

Even when the aforesaid is repeated, except that the molar excess of the diamine in the batch is increased to 25%, at the end of the process, the resulting reaction mass also contained more than 6% diamide and about 3% of unreacted diamine. Therefore even after the subsequent removal of the unreacted diamine from said reaction masses, neither of them was of such high quality product that the filtration step could be omitted. When used for the production of such "finished" solution, the diamide precipitated out of its "finished" product after one day of 40° F. It was also found that further increasing the excess molar content of diamine in batch did not result in any meaningful or significant decrease in the diamide content of the resultant reaction mass.

In the course of my experimentations, I discovered that I could significantly improve the purity of imidazolines, monoamides and mixtures of two or more of them produced by reacting said fatty acids with said diamines. I found that the resulting reaction masses so produced and containing diamides therein could be purified by molecular distillation at reduced pressure of 50–100 microns of mercury pressure and at a temperature of 170°–190° C. In this process, the imidazoline and/or monoamide components of said masses flashed over and were recovered, while the diamide drained down as rejected material. While adequate separation was achieved, the cost of adequate equipment coupled with the cost of operation and unavoidable loss of some of the imidazoline and/or monoamide components together with the diamide reject in drain down, made use of that process commercially uneconomical.

Summary of the invention

After considerable experimentation, I was completely surprised to find that the amount of diamide could be very substantially reduced by maintaining a considerable excess of diamine continuously in the system throughout the entire condensation process. I unexpectedly found that in the production of high imidazoline-content organic reaction masses, produced by heating mixtures of one of said diamines and one or a combination of two or more of said fatty acids in said apparatus heretofore described, and continuously removing therefrom through the reflux condenser distillate comprising water of reaction produced and some of the diamine, with said heating and removal of distillate being continued until the amount of said water removed measured at least 1.75 and between 1.75–2 mols per mole of fatty acid originally in said mix, that the amount of diamide produced and present in the resulting organic reaction mass could be considerably reduced, generally by at least 75%, by: over the entire period that said water of reaction is being produced, continuously maintaining in said system at least about 1.08 moles of said diamine per mol of said fatty acid originally in said mixture, said amount of diamine calculated on the basis that none of the unremoved diamine has been reacted. Said ratio of about 1.08 to 1 has been found adequate whereas when the ratio is reduced to 1.05 to 1, it has been found inadequate. However, in factory practice it is preferable that the ratio be above about 1.08 to 1 and within the limits of about 1.08–1.5 to 1. I have found a ratio of 1.1 to 1 to be eminently suitable in factory practice for the purposes intended without being economically intolerable. Said ratio was maintained throughout the entire reaction period during which the 1.75–2 moles of water of reaction were produced and removed. The most preferred procedure is that said ratio be maintained until more than 1.75 and about 2 mols of water of reaction have been produced and removed. By employing the foregoing novel invention fatty acid-diamine condensates are produced and contain less than 2% by weight thereof of diamide. Such condensates are per se useful products of commerce. Also they may later be reacted in aqueous media to produce 20–50% solutions of the amphoteric derivatives thereof by following the methods of said patents hereinbefore referred to. These water soluble amphoteric "finished" products contain minute proportions of diamide as to be soluble in said solutions and/or to be solubilized thereby so that the diamide present will not precipitate or grain out when said solutions, which are sparkling clear, are maintained indefinitely under temperatures encountered in shipping and storage. The preferential crystal clear solutions produced contain about 20–40% of said amphoteric derivatives. The amount of diamide therein is considerably below 0.8% and is no greater and in practically all cases below 0.69% by weight. Thus grain-out prevention is assured.

The following is a more specific yet general description for achieving the new and unexpected results of the invention: in commercial practice the fatty acid employed is heated in the reaction vessel to its molten state and while in this condition about 1.1 mols of diamine per mole of fatty acid is added thereto to provide at least 10% excess of diamine. Then the reflux condenser is connected to said vessel and the temperature of the mass is increased to a temperature where reaction is initiated. Prior to reaching said temperature, which is evidenced by some distillate coming off of the mass and removed therefrom, the quantity of diamine therein should be in excess of 10% whereby excess of at least about 10% is maintained throughout the entire period before first replenishment thereof is effected. (The amount of diamine therein throughout the entire reaction period herein described is calculated on the assumption and basis that the unremoved diamine has not been reacted, notwithstanding the fact that substantial quantities thereof have in fact been reacted.) Just prior to this stage, vacuum is applied to reduce the pressure above the reacting mass, which for example was at a temperature of about 140° C., when distillate started to come off and was collected. The vacuum and heating were continued to progressively increase the temperature thereof to certain levels and to decrease further the pressure over certain periods of time, and throughout the distillates were recovered and the water and diamine contents of each were determined. The amount of unremoved diamine therein calculated as before set forth was continuously maintained in amount to provide at least about 10% molar excess diamine per mole of fatty acid originally therein. This was effected by periodically adding continually well below the surface of the reacting mass amounts of diamine at least equal to the amount which is expected and known will be distilled out before the next addition is to be made. The additions are made at frequent intervals, with care being taken to add sufficient diamine at said intervals to assure the maintainence of the unremoved diamine level as calculated to said value of at least about 10% molar excess per mole of fatty acid based upon the assumption that the entire original or initial amount of diamine is present therein. This procedure is followed while the mass is being heated to increase the temperature thereof to approximately 180°–200° C. and the pressure is reduced to about 15–5 or less mm. of mercury pressure. The time of reaction of the diamine and fatty acid and conversion of the resulting monoamide reaction product to the imidazoline is such that the amount of water of reaction produced and removed is 1.75–2 mols and the amount of imidazoline produced therein measures about 75–99% of theoretical, evidenced by said removal of 1.75–2 moles of water per mole of fatty acid originally in the mix. In the practice of this invention, as a matter of convenience, I prefer to provide an original mix consisting of 1 mole of fatty acid and at least about 1.08 moles of diamine when the temperature thereof is below the reaction temperature. When the temperature of the mass reaches a value just below the initial reaction temperature, a quantity of diamine is added to the mix to increase the molar excess of diamine. Upon continued heating to elevate further the temperature of the mass beyond that required for initiating reaction of the mass, subatmospheric pressure conditions are continued and reaction proceeds and the distillate, consisting mostly of water and some diamine is recovered over a period of 45–60 minutes and will be found to contain a quantity of diamine less the amount which would be required to reduce the unremoved diamine as before calculated to less than 10% molar excess per mole of fatty acid initially in said mass. At this stage diamine is added thereto in quantity greater than that contained in said distillate because I know that as the temperature is increased and the pressure reduced, the quantity of diamine which will come over with the distillate over the next interval, which may be one or two hours or so, will be increased. Again the quantity of diamine added is in sufficient excess that throughout said next interval of reaction, the diamine content is present in at least said 10% molar excess. In the case of subjecting lauric acid and at least 1.08 mols of aminoethyl ethanol amine to the foregoing procedure over a period of about 2 hours at temperatures increasing from about 140° C. to about 170° C. and progressively reduced pressure conditions approximately 1.1 moles of water of reaction were produced and recovered. At this stage, a small sample of the mass was tested for fatty acid content by titration and the result was zero establishing that all of the fatty acid component had reacted. While I prefer continuously to maintain the diamine content in said apparatus during said entire reaction period to said value of at least about 1.1 moles (10% molar excess) per mole of fatty acid initially in said mix, to aid in assuring reduction in diamide formation, I found it to be more critical to so maintain said excess diamine content in that entire period after about 1.1 moles of water per mole of fatty acid initially in the mix have been produced and removed and up to the time that 1.75–2 moles of water per mole of fatty acid initially in said mix have been produced and removed. This is due to my finding that despite the free fatty acid content being zero (by titration), at the stage when 1.1 moles of water of reaction have been removed, diamide formation in greater part occurs thereafter in the absence of said excess of diamine in that period. Therefore at the end of said about 2 hours period, diamine is continually added in appropriate amounts at respective uniform rates to maintain continuously said excess of diamine in the said system or apparatus throughout the entire process until 1.75–2 moles of water of reaction are produced and removed and the excess diamine is stripped off. The resulting reaction mass consists essentially of imidazoline measuring more than 90% of theoretical and said reaction mass contains therein a quantity of diamide when lauric acid was used, measuring less than 1.5 and preferably less than 1% thereof as compared with its being present in amount of more than 6% by following the same procedure and using up to a 25% excess of diamide in the initial mixture, without any diamine additions thereto in the course of the reaction.

Description of the preferred embodiments

The following examples are given by way of illustrating the present invention, and are to be regarded as illustrative and not by way of limitation, all parts and percentages being by weight unless otherwise specified.

Example 1

500 pounds (2.5 moles) of lauric acid was charged into a reaction vessel equipped with a stirrer and a reflux condenser and connected to a vacuum pump, heated to about 100° C. at which temperature it was in the fluid condition and then while the stirrer is constantly rotating throughout this entire process.

280 pounds (2.74 moles) of aminoethylethanolamine (AEEA) were charged therein and mixed therewith to provide a mixture with the mole ratio of said fatty acid to said diamine being 1 to 1.096, thereby providing a 9.6% molar excess of diamine per mole of fatty acid used.

The constantly stirred mixture was heated to 140° C. which represents the approximate temperature at which reaction was initiated and this stage is shown as the 0 elapsed time in the following Table I and distillates collected and diamine additions made as shown therein, with the respective additions made at respective substantially uniform rates over the respective periods.

TABLE I

| Elapsed Time (hr.min). | Temperature (° C.) | Pressure, mm., Hg | AEEA Added (lbs.) | Distillate (lbs.) | | |
|---|---|---|---|---|---|---|
| | | | | Total | AEEA | Water |
| 0 | 140 | 178 | 6 | | | |
| 1:10 | 163 | | 15 | 52.4 | 4.2 | 48.2 |
| 1:55 | 179 | 70 | 23 | 25.9 | 10.8 | 15.1 |
| 2:45 | 190 | 53 | 45 | 37.3 | 23.3 | 13.9 |
| 3:55 | 192 | 34 | 10 | 48.8 | 37.7 | 11 |
| 4:45 | 193 | 30 | | 20.8 | 17.8 | 2.9 |
| 6:15 | 195 | 13 | | 19 | 18.9 | .05 |

The diamine, aminoethylethanolamine, labeled AEEA in this and the other tables in the respective quantities shown was added in a continuous stream at respectively substantially uniform rates to the mass over the respective recited elapsed times. The respective additions were made by introducing the diamine through a tube whose discharge end was disposed considerably below the upper surface of the mix. The initial 6 pounds diamine addition to said mix was made a uniform rate in the aforesaid manner over the 1 hour and ten minute period after the mix reached 140° C. and when the mass reached 163° C. the 15 pound diamine addition was made at a different but uniform rate in the aforesaid manner over the next 45 minutes when the mass reached the temperature of 179° C., etc. The temperature of the mass was increased and the pressure above the mass was continuously reduced as shown in the table by the use of a vacuum pump to the values recited and the distillates were recovered and measured as were the components therein as recited.

After the 6¼ hours of reaction and stripping as shown in this table, the total amount of water recovered measured 91.33 pounds, which represents 2.04 moles per mole of fatty acid originally in said mix. At the end of said 6¼ hour period, the vacuum was turned off and heat removed. The resulting mass weighed 680 pounds and had an imidazoline content greater than 99% of theoretical based upon the fatty acid originally in said mix, and about 1.5% unremoved diamine and a diamide content of less than 0.75% by weight thereof as calculated from the determination of diamide present in a sparkling clear 24% aqueous solution of water-soluble amphoteric derivative thereof produced in the general manner hereafter described. The resulting mass represents a novel product of commerce notwithstanding its water insolubility characteristic. The resulting reaction mass was divided into two equal portions which were respectively reached in an aqueous medium with chloracetic acid and caustic soda in the manners described in my Patents 2,528,378 and 2,773,068 whereby there were obtained sparkling clear solutions containing 24% of water-soluble amphoteric surface active agents. Each solution had a diamide content of less than 0.13% which is well below the threshold value for graining or precipitating out at a temperature of 40° C. These solutions were maintained at 40° C. for three months and throughout and at the end of that period were still sparkling clear with no evidence of any graining or precipitate therein.

Controls were run by following the same procedure as that of Example 1 except that after the original fatty acid and diamine mix was first made, there was no addition of diamine thereto. The sparkling clear solution as produced contained more than 1.25% diamide. The solutions were maintained at 40° F. and at the end of 24 hours showed appreciable graining or precipitate which had "thrown out" of solution thus rendering products of such quality as to require filtration.

Example 2

The same apparatus and general procedure as those described in Example 1 were used, except that the quantities of components were changed, as were the quantities, times and rates of diamine additions as set forth in the following Table II.

In this example 1000 lbs. (5 mols) of the lauric acid and 570 pounds (5.1 mols) of aminoethyl ethanol amine were initially mixed together in the reaction vessel.

TABLE II

| Elapsed Time (hr.:min.) | Temperature (° C.) | Pressure, mm., Hg | AEEA Added (lbs.) | Distillate (lbs.) | | |
|---|---|---|---|---|---|---|
| | | | | Total | AEEA | Water |
| 0 | 140 | 240 | 12 | | | |
| 2:15 | 172 | 120 | 25 | 102 | 7.2 | 94.8 |
| 3:40 | 183 | 60 | 45 | 56 | 24 | 32 |
| 5:15 | 190 | 40 | 85 | 70 | 46 | 24 |
| 7:50 | 194 | 30 | 25 | 91 | 69 | 22 |
| 9:35 | 195 | 25 | 19.2 | 57 | 50 | 6.5 |
| 10:05 | 198 | 8 | | | | |
| 10:50 | 196 | 8 | | 22.5 | 21.8 | .8 |

A determination was made of diamide content in the sparkling clear solution of the water-soluble amphoteric derivative produced from said condensate with chloracetic acid and caustic soda in the manner described in my Patent 2,528,378 and being present in a concentration of 24% by weight thereof. Said diamide content in said solution was found to be 0.11% by weight thereof and consequently the diamide content of said condensate measured less than 0.7% by weight thereof.

Example 3

The same apparatus and general procedure as those described in Example 1 were used except that the components and quantities thereof were changed as were the quantities, rates and times of diamine additions as set forth in Table III.

In this example 1044 pounds of coconut fatty acid and 560 pounds of aminoethyl ethanol amine were initially mixed in the reaction vessel.

TABLE III

| Elapsed time (hr.:min.) | Temperature (° C.) | Pressure, mm., Hg | AEEA Added (lbs.) | Distillate (lbs.) | | |
|---|---|---|---|---|---|---|
| | | | | Total | AEEA | Water |
| 0 | 140 | 255 | 8 | | | |
| 1:30 | 155 | 210 | 12 | 80 | 4 | 76 |
| 2:50 | 174 | 120 | 25 | 48 | 10 | 38 |
| 4:50 | 186 | 65 | 40 | 57 | 24 | 33 |
| 7:05 | 195 | 39 | 35 | 61 | 39 | 22 |
| 8:25 | 197 | 21 | | 47.5 | 36.6 | 11 |
| 9:20 | 198 | 9 | | 28 | 28 | |

The resultant condensate contained diamine weighing only about 2% by weight thereof as calculated by ascertaining that there was on a .68% by weight diamine content in a 40% sparkling clear aqueous solution of water soluble amphoteric material produced by reacting in an aqueous medium said condensate with 2 mols of chloracetic acid and caustic soda in the manner described in my Patent 2,773,068.

Example 4

The same apparatus and general procedure as those described in Example 2 were used, except that the quantities of components were changed as were the quantities, rates and times of diamine additions as set forth in Table IV.

In this example 592 pounds (2.975 mols) of lauric acid and 360 pounds (3.45 mols) (about 16% excess) of amino ethyl ethanol amine were initially mixed in the reaction vessel.

TABLE IV

| Elapsed Time (hr.:min.) | Temperature (° C.) | Pressure, mm., Hg | AEEA Added (lbs.) | Distillate (lbs.) | | |
|---|---|---|---|---|---|---|
| | | | | Total | AEEA | Water |
| 0 | 142 | 630 | 0.75 | | | |
| 0:45 | 150 | 390 | 3.75 | 30.375 | 0.57 | 29.8 |
| 2 | 169 | 190 | | 29.25 | 1.26 | 28 |
| 3 | 189 | 180 | 10.5 | 14.25 | 1.85 | 12.4 |
| 4:30 | 196 | 140 | | | | |
| 5:30 | 192 | 50 | | 31.5 | 10.89 | 20.6 |
| | Interrupted Overnight | | | | | |
| 0 | 180 | 50 | 8.09 | | | |
| 1:30 | 190 | 40 | | 10.25 | 5.96 | 4.3 |
| | Stripping of Excess Diamine | | | | | |
| 3:30 | 193 | 6 | | 48 | 41.14 | 6.9 |

The resulting condensate contained diamine weighing only about 1.2% by weight thereof as calculated by ascertaining that the diamine content weighed only 0.21% of a 24% sparkling clear aqueous solution of water soluble amphoteric derivative thereof produced from said condensate in aqueous medium with chloracetic acid and caustic soda in the manner described in my Patent 2,528,378.

Example 5

The same apparatus and general procedure as those described in Example 3 were used, except that the components were changed as were the quantities, rate of, time of diamine additions as set forth in Table V.

In this example 795 pounds (3.8 mols) of coconut fatty acid and 468 pounds (4.48 mols) (about 16% excess) of amino ethyl ethanol amine were initially mixed in the reaction vessel.

TABLE V

| Elapsed Time (hr.:min.) | Temperature (° C.) | Pressure, mm., Hg | AEEA Added (lbs.) | Distillate (lbs.) | | |
|---|---|---|---|---|---|---|
| | | | | Total | AEEA | Water |
| 0 | 148 | | 2.25 | | | |
| 1:30 | 153 | 208 | 6.58 | 49.5 | 1.34 | 47.16 |
| 3 | 174 | 187 | 8.4 | 32.75 | 2.48 | 30.27 |
| 4 | 179 | 120 | 17 | 17.75 | 5.34 | 12.41 |
| 5 | 180 | 54 | 5 | 37.75 | 19.09 | 18.66 |
| 5:30 | 185 | 40 | | 19.25 | 7.46 | 11.79 |
| | Stripping of Excess Diamine | | | | | |
| 7 | 183 | 10 | | 47.75 | 39.37 | 8.38 |
| 8 | 194 | 10 | | 31.25 | 25.3 | 5.95 |
| 8:15 | 194 | 10 | | 2.25 | 1.85 | .4 |

The resulting condensate contained diamine weighing only about 1.9% by weight thereof as determined by ascertaining that the diamine content weighed only .62% of a 40% sparkling clear aqueous solution of water soluble amphoteric derivative thereof produced from said condensate in aqueous medium with chloracetic acid and caustic soda in the manner described in my Patent 2,528,378.

All of the novel sparkling clear solutions of the examples herein so remained and showed no signs of graining even after being maintained at 40° C. for 3 months. Their controls on the other hand showed a great deal of graining after only 21 days at 70° F. due to the comparatively great diamide contents thereof.

Instead of said fatty acids used in said examples, caprylic, abietic, linoleic, linolenic, oleic or other R—COOH reactants may be substituted therefor and other other diamines may be substituted for the aminoethylethanolamine, examples of which are those wherein $R_1$ is $C_2H_5$, $C_3H_6$, $C_4H_8$, or $CH_2$—$CHOH$—$CH_3$ or $CH_2$—$CHOH$—$CHOH$—$CH_3$, $CH_2$—$CHOH$—$C_2H_5$, etc.

Since certain changes may be made in carrying out the above process without departing from the scope of the invention, it is intended that all matter contained in the above description shall be interpreted as illustrative and not in a limiting sense.

It is to be understood that the following claims are intended to cover all the generic and specific features of the invention herein described, and all statements of the scope of the invention, which as a matter of language might be said to fall therebetween.

It is also to be understood that in the claims, reactants recited in the singular are intended to include said mixtures of the respective reactants.

I claim:

1. In the method for producing a high imidazoline-content organic reaction mass produced in a reaction vessel operatively connected to a reflux condenser by heating therein a mixture comprising a diamine within the generic formula $NH_2C_2H_4NHR_1$ and a fatty acid within the generic formula R—COOH and continuously removing therefrom distillate comprising water of reaction produced therein and some of said diamine, said heating and removal of distillate being continued at least until the amount of said water removed measures at least 1.75 mols per mole of said fatty acid originally in said mixture;

R is of 5–25 carbon atoms and is alkyl or (alkenyl) aliphatic hydrocarbon containing one or more olefinic linkages or the hydrocarbon radical of abietic acid;

$R_1$ is alkyl or alkylol of 2–4 carbon atoms;

the improvement for reducing the quantity of diamide reaction product produced therein, comprising:

over the entire period that said water of reaction is being produced continuously maintaining therein at least 1.08 moles of diamine per mole of fatty acid originally in said mixture, said amount of diamine calculated on the basis that none of the unremoved diamine has been reacted.

2. In the method according to claim 1, then removing free diamine therefrom.

3. In the method according to claim 1, $R_1$ is $C_2H_4OH$.

4. In the method according to claim 3, then removing free diamine therefrom.

5. In the method according to claim 3, said fatty acid is lauric acid.

6. In the method according to claim 5, removing free diamine therefrom.

7. In the method according to claim 3, said fatty acid is coconut fatty acid.

8. In the method according to claim 7, then removing free diamine therefrom.

9. In the method according to claim 3, said fatty acid is abietic acid.

10. In the method according to claim 9, then removing free diamine therefrom.

11. In the method according to claim 1, with said heating and removal of said distillate being continued until the amount of said water removed measures more than 1.75 and about 2 mols per mol of said fatty acid originally in said mixture.

12. In the method according to claim 11, then removing free diamine therefrom.

13. In the method according to claim 11, $R_1$ is $C_2H_4OH$.

14. In the method according to claim 13, then removing free diamine therefrom.

15. In the method according to claim 13, said fatty acid is lauric acid.

16. In the method according to claim 15, removing free diamine therefrom.

17. In the method according to claim 13, said fatty acid is coconut fatty acid.

18. In the method according to claim 17, then removing free diamine therefrom.

19. In the method according to claim 13, said fatty acid is abietic acid.

20. In the method according to claim 19, then removing free diamine therefrom.

References Cited

UNITED STATES PATENTS

| | | | |
|---|---|---|---|
| 2,528,378 | 10/1950 | Mannheimer | 260—309.6 |
| 2,773,068 | 12/1956 | Mannheimer | 260—309.6 |
| 2,985,662 | 5/1961 | Johnson et al. | 260—309.6 |
| 3,231,580 | 1/1966 | Mannheimer | 260—309.6 |

HENRY R. JILES, *Primary Examiner.*

NATALIE TROUSOF, *Assistant Examiner.*